US005433753A

United States Patent [19]
Dahmen et al.

[11] Patent Number: 5,433,753
[45] Date of Patent: Jul. 18, 1995

[54] USE OF COPOLYMERS HAVING POLYSILOXANE UNITS IN THE TREATMENT OF LEATHER AND FURS

[75] Inventors: Kurt Dahmen, Monchen-Gladbach; Richard Mertens, Krefeld; Manfred Kaussen, Aachen; Helmut Lohmann; Horst Kilian, both of Krefeld, all of Germany

[73] Assignee: Chemische Fabrik Stockhausen GmbH, Krefeld, Germany

[21] Appl. No.: 244,187

[22] PCT Filed: Nov. 24, 1992

[86] PCT No.: PCT/EP92/02698
§ 371 Date: May 25, 1994
§ 102(e) Date: May 25, 1994

[87] PCT Pub. No.: WO93/11268
PCT Pub. Date: Jun. 10, 1993

[30] Foreign Application Priority Data

Nov. 28, 1991 [DE] Germany ............... 41 39 090.3

[51] Int. Cl.$^6$ ............... C14C 9/00; C14C 9/02
[52] U.S. Cl. ................. 8/94.23; 8/94.21; 8/94.22; 8/94.18; 252/8.57
[58] Field of Search ............. 8/94.2, 94.21, 94.22, 8/94.23, 94.33, 94.18; 427/389; 252/8.57

[56] References Cited

U.S. PATENT DOCUMENTS

| | | | |
|---|---|---|---|
| 3,624,015 | 11/1971 | Vaughn | 524/145 |
| 4,527,992 | 7/1985 | Friese et al. | 8/94.21 |
| 4,931,062 | 6/1990 | Bay et al. | 8/94.23 |
| 5,124,181 | 6/1992 | Schaffer et al. | 252/8.57 |
| 5,226,923 | 7/1993 | O'Lenick, Jr. | 252/8.57 |
| 5,279,613 | 1/1994 | Schaffer et al. | 8/94.21 |
| 5,316,860 | 5/1994 | Stewart et al. | 8/94.21 |

FOREIGN PATENT DOCUMENTS 408311 1/1991 European Pat. Off. .

*Primary Examiner*—Prince Willis, Jr.
*Assistant Examiner*—Alan D. Diamond
*Attorney, Agent, or Firm*—Oblon, Spivak, McClelland, Maier, & Neustadt

[57] ABSTRACT

The present invention discloses the use of polymers which have built-in by polymerization 20 to 70%-wt. of a hydrophobic monomer selected from long-chain alpha-olefins, long-chain alkyl(meth)acrylates, vinyl esters of long-chain carboxylic acids, long-chain vinyl ethers, or mixtures of these monomers, 1 to 60%-wt. of a monomer with a specific polysiloxane group, and 20 to 35%-wt. water-soluble, unsaturated acids, unsaturated $C_4$–$C_6$ dicarboxylic anhydrides, semi-esters or semi-amides of unsaturated $C_4$–$C_6$ dicarboxylic acids, or mixtures of these monomers, in partially neutralized form as aqueous solution or dispersion, for softening, fat-liquoring and greasing, or hydrophobing leathers and furs.

6 Claims, No Drawings

USE OF COPOLYMERS HAVING POLYSILOXANE UNITS IN THE TREATMENT OF LEATHER AND FURS

This application is a 371 of PCT/EP92/02698 filed Nov. 24, 1992.

The present invention relates to the use of specific copolymers in which monomers with a polysiloxane group are included by polymerization in the treatment of leather and furs. Soft, full leather or comfortably soft furs with excellent water-repellent properties are obtained by this treatment.

EP-A-0 372 746 describes an agent for the treatment of leather, which is based on an amphiphilic copolymer the major part of which consists of at least one hydrophobic monomer selected from long-chain alkyl(meth)acrylates, long-chain alkoxy or alkylphenoxy(polyethyleneoxide) (meth)-acrylates, alpha-olefins, vinyl esters of long-chain carboxylic acids and mixtures thereof, and a minor amount which consists of at least one hydrophilic, water-soluble, ethylenically unsaturated acidic or basic monomer. Leather treated with these polymers exhibits a soft feel, however, has poor hydrophobic properties which can only be improved by subsequent, fixing with tanning mineral salts.

For reasons of environmental impact, the use of tanning mineral salts in the leather industry has to be reduced considerably. Secondary fixing with mineral salts is no longer desirable and, in addition, requires an additional process step.

German Offenlegungsschriften [publication of a patent application] Nos. 39 26 168, 39 26 167, 39 31 039 describe copolymers of long-chain alkylvinyl ethers and unsaturated dicarboxylic anhydrides, or long-chain olefins and unsaturated dicarboxylic anhydrides, or long-chain, unsaturated esters and unsaturated carboxylic acids, respectively, in the hydrophobing of leathers. In the Bally-Penetrometer, the finished leathers exhibit a water-absorption of 19.5% (e.g. DE-OS 39 31 039).

DE-OS 38 00 629 describes carboxyl-groups-containing polysiloxanes in neutralized form—the functionality amounts to 2—which are used to render leather and furs water-repellent.

EP-A-0 408 311 relates to a polymer which is used as hair conditioner and comprises 0 to 84.9%-wt. of a hydrophobic, ethylenically unsaturated monomer, 0.1 to 85%-wt. of an ethylenically unsaturated monomer with a polysiloxane group, wherein the monomer exhibits at least one unsaturated, radically polymerizable group and a polysiloxane group according to the formula

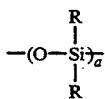

in which a=1 to 150, and 15 to 99.9%-wt. of a hydrophilic, ethylenically unsaturated monomer selected from radically polymerizable cationic, artionic, nonionic or amphoteric monomers. For the purpose of hair conditioning, it is preferred to use a polymer consisting of 40 to 84.5%-wt. of the hydrophobic monomer, 0.5 to 70%-wt. of the polysiloxane-groups-containing monomer, and 15 to 59.5%-wt. of the hydrophilic monomer.

The quantity of hair conditioner in conventional cosmetic preparations amounts of 0.1 to 10%-wt.

It is the object of the present invention to use the copolymers known from EP-A-408 311 for a new application, namely in the treatment of leather and furs.

The hydrophobing of leather with polysiloxanes carried out from an organic solution or aqueous emulsion is also known from the prior art. If an aqueous emulsion is used, the emulsifier system required for the preparation of the emulsion must be inactivated by the addition of tanning mineral salts, this is an undesired method as mentioned above.

Since the unbonded polysiloxanes migrate within the leather, they cause difficulties with respect to the adhesive strength of the finishing materials and in the glueing of leathers, e.g., in the production of footwear, irrespective of the form of application.

In particular, it is the object of the present invention to provide an improved treatment of leather and furs with respect to softness, feel and their water-repellent properties with the help of polysiloxane-copolymers that do not contain emulsifiers and eliminate the above-mentioned disadvantages.

According to the present invention, this object is achieved by the treatment of leather and furs, for the purpose of softening, fat-liquoring or hydrophobing them, with copolymers having incorporated by polymerization a) 20 to 70%-wt. of a hydrophobic monomer selected from long-chain alpha-olefins with 12 to 30 C-atoms, long-chain alkyl(meth)acrylates with 12 to 30 C-atoms in the alkyl section, vinyl esters of long-chain carboxylic acids with 12 to 30 C-atoms, long-chain vinyl ethers with 12 to 30 C-atoms, or mixtures of these monomers, b) 1 to 60%-wt. of one or several monomers with a polysiloxane group according to formulas (I) and/or (II):

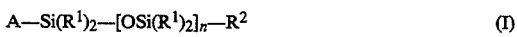

wherein the structural units [OSi(R¹)₂] and [OSiR¹A] in formula (II) are to be distributed randomly over the chain and wherein R¹=phenyl or methyl, R²=A, phenyl or alkyl with 1 to 30 C-atoms, n=2–100, z=1–3, and A is an unsaturated, radically polymerizable group selected from

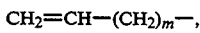

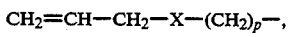

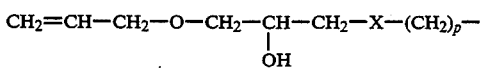

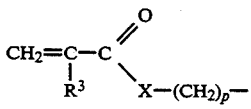

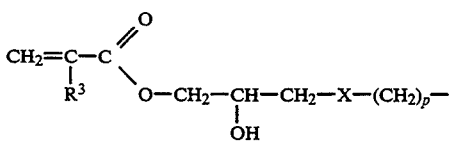

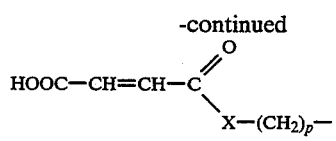

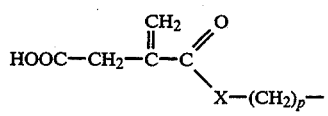

or

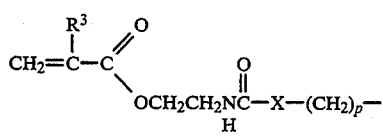

with m=0 to 10, p=1 to 4, $R^3$=H or $CH_3$, and X=O or NH, c) 20 to 35%-wt. water-soluble, unsaturated, polymerizable, acid-groups-containing monomers and/or unsaturated $C_4$-$C_6$ dicarboxylic acid arthydrides and/or semi-esters and/or semi-amides of unsaturated $C_4$-$C_6$ dicarboxylic acids or mixtures of these monomers, in partially neutralized form as aqueous solution or dispersion.

As compared to the fatliquoring and hydrophobing agents known from the state of the art, these copolymers provide improved properties of leathers and furs with respect to softness, feel and hydrophobing.

The copolymers are manufactured by radical bulk or solvent polymerization of the monomers according to the groups (a), (b) and (c) at temperatures of 50° to 200° C.

Examples of suitable monomers of group (a) include alpha-olefins with at least 12 carbon atoms, e.g., dodecene, tetradecene, hexadecene, octadecene, $C_{20}$-olefin-1, $C_{24}$-olefin-1, $C_{30}$-olefin-1, or the technical mixtures of different distillation fractions.

Dodecyl-(meth)-acrylate, tetradecyl(meth)acrylate, hexadecyl(meth)acrylate, stearyl(meth)acrylate, oleyl(meth)acrylate, n-eicosyl(meth)acrylate, n-docosyl(meth)acrylate, or the esters of (meth)-acrylic acid and technical fatty alcohol mixtures, such as, $C_{12}$/$C_{14}$-alcohol, $C_{14}$-$C_{18}$-alcohol, or $C_{20}$-$C_{22}$-alcohol are used as long-chain alkyl(meth)acylates.

Vinyl esters of carboxylic acids with 12 to 30 C-atoms are also suitable monomers of group (a). These monomers, for example, include vinyl laurate, vinyl palmitate, vinyl stearate, vinyl oleate, or vinyl tallow fatty acid ester. In addition, long-chain vinyl ethers, e.g., dodecyl vinyl ether, tridecyl vinyl ether, hexadecyl vinyl ether, octadecyl vinyl ether, oleyl vinyl ether, or tetracosyl vinyl ether, are useful monomers according to group (a).

Radically polymerizable monomers with a polysiloxane group are used as components of group (b), said polysiloxane groups may be described by the general formulas (I) and (II):

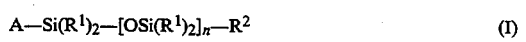

wherein the structural units [OSi($R^1$)$_2$] and [OSi$R^1$A] in formula (II) are to be distributed randomly over the chain and wherein $R^1$=phenyl or methyl, $R^2$=A, phenyl or alkyl with 1 to 30 C-atoms, n=2-100, z=1-1- ,and A is an unsaturated, radically polymerizable group selected from

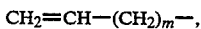

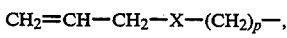

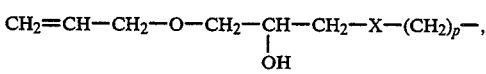

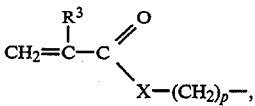

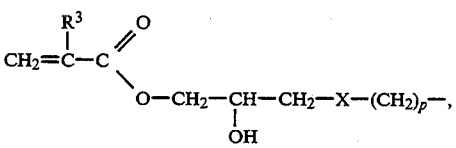

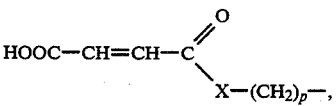

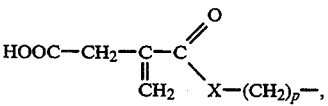

or

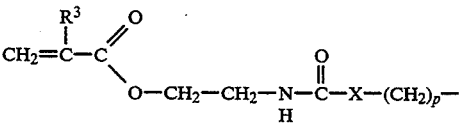

with m=0 -10, p=1 -4; $R^3$=H or methyl, and X=O or N,

Examples of monomers (b) include: alpha, omega-divinylpolydimethyl siloxane, alpha, omega-divinylpolydiphenyl siloxane, allylpolydimethyl siloxane, alpha, omega-diallyloxypropyl polydimethyl siloxane, alpha, omega-di(meth)acryloyloxypropyl polydimethyl siloxane, alpha, omega-di(meth)acryloyloxy(2-hydroxy-3-propoxypropyl)polydimethyl siloxane, alpha, omega-di(meth)acrylamidopropyl polydiphenyl siloxane, (meth)acrylamidopropyl polydimethyl siloxane, maleoyloxypropyl polydimethyl siloxane, alpha, omega-dimaleamidopropyl polydimethyl siloxane, N-(2-(meth)acryloyloxyethyl carbamyloxypropyl polydimethyl siloxane, poly(dimethylsiloxane-co-methylvinyl siloxane), poly(dimethylsiloxane-co-methyl(meth)acryloylexyethyl siloxane) and poly(dimethyl siloxane-co-methylmaleamidopropyl siloxane).

The monomers of group (c) are selected from the above-mentioned water-soluble, unsaturated, acid-groups-containing monomers, such as, for example, sulfonic acids and carboxylic acids, unsaturated $C_4$-$C_6$ dicarboxylic anhydrides and semi-esters or semi-amides of unsaturated $C_4$-$C_6$ dicarboxylic acids, e.g., (meth)acrylic acid, iraconic acid, maleic acid, acrylamido-2-methylpropane sulfonic acid, vinyl sulfonic acid, methallyl sulfonic acid, styrene sulfonic acid, maleic anhydride, itaconic anhydride, methylene-malonic acid anhydride, and the semi-esters or semi-amides, respectively, of maleic acid, fumaric acid, itaconic acid, or methylene-malonic acid. The suitable primary and secondary amines from which the semi-amides are formed by reaction with the dicarboxylic acids or dicarboxylic anhydrides may have 1 to 30 C-atoms, e.g., methylamine, dimethylamine, propylamine, dibutylamine, octylamine, cyclohexylamine, dodecylamine, stearyl amine, oleylamine, ethanolamine, or propanolamine. The semi-esters are formed from the dicarboxylic acids or the anhydrides with alcohol.

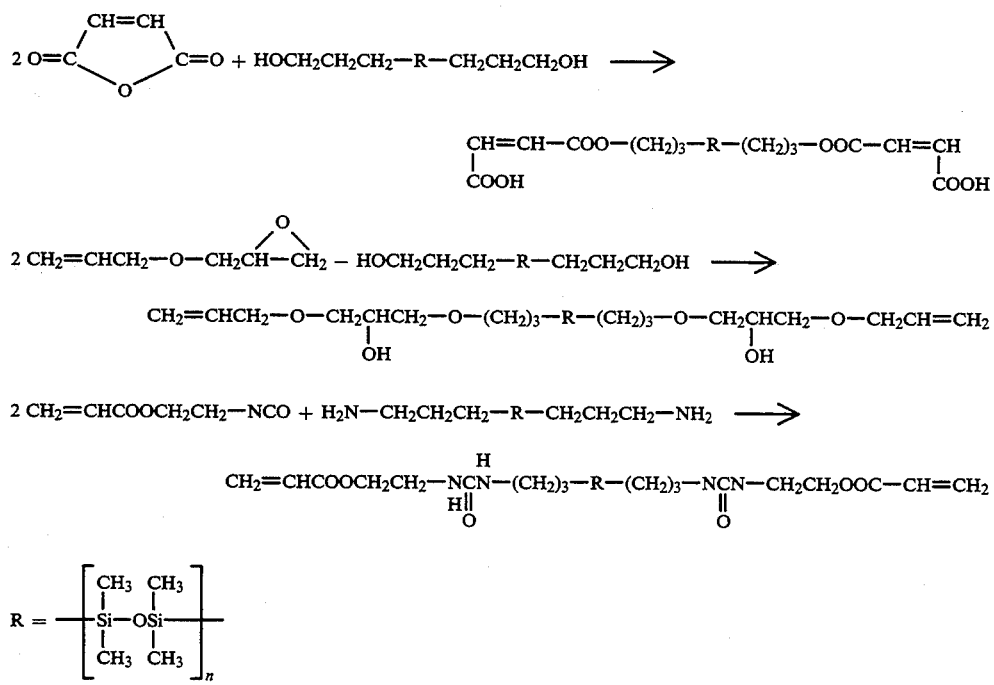

Suitable alcohols, for example, are methanol, ethanol, isopropanol, n-, i- and/or tert.-butanol, cyclohexanol, octanol, dodecanol, stearyl alcohol, ocenol, behenyl alcohol, or the technical fatty alcohol cuts, such as, $C_{12}$–$C_{14}$-alcohol or $C_{16}$–$C_{18}$-alcohol, as well as isopropyl glycol and n-, i- and/or tert.-butyl glycol.

The copolymers are produced by radical polymerization performed as bulk or solvent polymerization at temperatures of 50° to 200° C. Bulk polymerization is preferred; however, if the molecular weight of the copolymers or the viscosity of the polymeric mass, respectively, is excessively high and difficulties in handling occur, a solvent may additionally be used for dilution purposes. Preferred solvents are those also used in leather treatment formulations, e.g., olefins/ paraffins, high-boiling aromatics, fatty acid esters, triglycerides or butyl glycol.

The molecular weight of the copolymers is in the range of 1000 and 40,000 g/mol and may be controlled by the polymerization temperature, the amount of initiator and—optionally—chain transfer agents. The known polymerization initiators are used to start the polymerization; they are employed in amounts of 0.1 to 7%wt. (relative to the mass of monomers); the skilled artisan will be able to select the most suitable catalysts for a desired polymerization temperature.

The monomers according to group (b) which are included in the copolymers by polymerization may also be formed during the polymerization, for example, by reaction of an unsaturated dicarboxylic anhydride, an unsaturated glycide-compound, or an unsaturated isocyanate compound with an hydroxy or amino-functional polysiloxane. The following reaction equations will give a general survey:

These reactions may take place after the unsaturated dicarboxylic anhydride, the unsaturated glycidic compound, or the unsaturated isocyanate compound have been copolymerized, This means that the functional polysiloxane is linked with the copolymer via reactive groups of the copolymer, Also, the structure units of the dicarboxylic acid semi-esters and the dicarboxylic acid semi-amides of group (c), which are contained in the copolymers, may be pre-formed in the monomer; however, it is also possible that these structural units are formed from dicarboxylic acids or dicarboxylic acid anhydrides and the corresponding alcohols or amines, during or after the polymerization.

When the copolymers are finished, they are transferred into an aqueous solution or dispersion, and water and a base is added the amount of which suffices to effect partial neutralization of the carboxyl groups or the acid anhydride groups, respectively, The quantity of base is selected such that—preferably—a pH-value between 5 and 9 is adjusted in the aqueous solution or dispersion, Alkali hydroxide, amines and ammonia are suitable neutralization agents.

The aqueous copolymer dispersions so obtained are suitable for treating any conventionally tanned skins and furs. The tanned skins are normally neutralized prior to the treatment. They may be dyed prior to or after the treatment with the copolymers.

Treatment of the tanned skins with the copolymers is effected in aqueous liquor obtainable by diluting the copolymer dispersion with water. The treatment is effected at pH-values between 4 and 9 and at temperatures from 20° to 60° C. within a period of—preferably—20 to 90 minutes, e.g., by milling in a drum.

The amount of copolymer-solids used, relative to the shaved weight of the leather or the wet weight of the furs, preferably amounts to 2 to 15%-wt. Usually, the float length amounts to 30 to 500%. Subsequent to this treatment, the pH-value of the aqueous float is reduced to 3 to 4 by the addition of acids, preferably formic acid; the leather or furs are then rinsed with water, dried and further processed according to known manners.

It is possible to use known retanning agents or conventional fat liquors, e.g., based on sulfated, sulfonated or sulfited oils and fats, or hydrophobic agents, such as those based on paraffins or phosphoric acid esters; they can be used prior to, during, or after the treatment with the copolymers.

This copolymer-treatment results in leathers and furs with an excellent, soft and full feel and an even grain pattern. The water-repellent properties of the leathers/furs are superb; subsequent fixing with mineral salts can be dispensed with.

The finished leathers are tested with respect to water-absorption and water-permeability by means of the Bally-Penetrometer, the number of flexes is tested in the Maeser-testing apparatus.

The present invention will be illustrated in more detail by the following examples.

Production of the copolymer dispersions

Dispersion I

Production of the monomer with polysiloxane group

In a three-neck glass flask fitted with stirrer and cooler, 800 g alpha, omega-hydroxypropyl polydimethyl siloxane (Tegomer H-Si 2311, Th. Goldschmidt AG), 63 g maleic anhydride and 0.5 g tributylamine are filled and heated to 120° C. for 2 hours.

The maleic acid semi-ester of the dihydroxypolysiloxane used is obtained in quantitative yield.

Production of the copolymer

In a reactor equipped with stirrer and metering equipment, 300 g octadecene-1 are placed and heated to 140° C. Within a period of 3 hours, a mixture A consisting of 800 g of the above maleic acid semi-ester, 300 g acrylic acid, and 60 g dodecyl mercaptan, and a solution B consisting of 100 g butyl glycol, 20 g tert.-butyl-peroxy-2-ethyl hexanoate and 20 g di-tert.-butyl peroxide are dosed continuously. Stirring is continued for a further hour at 140° C., then the mixture is cooled to 100° C. A solution consisting of 300 g sodium hydroxide solution (45%) and 3680 g water having been heated to 70° C. is added then; stirring is continued until a homogeneous dispersion results. After cooling, a soft paste with 30% active substance is obtained which may be diluted with any amount of water. 21.5%-wt. octadecen-1, 57%-wt. polysiloxane monomer, and 21.5%-wt. acrylic acid are included in the copolymer by polymerization.

Dispersion II

In a reactor equipped with stirrer and metering devices, 1000 g octadecen-1 and 825 g alpha, omega-hydroxypropyl polydimethyl siloxane (Tegomer H-Si 2311, Th. Goldschmidt AG) are heated to 130° C. 66 g molten maleic anhydride, 30 g di-tert.-butyl peroxide, and 40 g tert.-butylperoxy-2-ethylhexanoate, as well as a mixture consisting of 580 g acrylic acid and 100 g dodecyl mercaptan are metered in over a period of 4 hours.

Stirring is continued for a further 2 hours at 150° C. followed by cooling to approximately 100° C.; then a mixture which has been heated to 70° C. and consists of 540 g sodium hydroxide solution (45%) and 6040 g water is added; it is stirred at 90° C. until a homogeneous dispersion results. After cooling, a viscous dispersion with approximately 30% active substance is obtained which may be diluted with water at will. 40.5%-wt. octadecene-1, 36%-wt. polysiloxane monomer, and 23.5%-wt. acrylic acid are built into the copolymer by polymerization.

Dispersion III 700 g of a $C_{20}$ to $C_{24}$ alpha-olefin-mixture and 200 g alpha, omega-hydroxypropyl polydimethyl siloxane (Tegomer H-Si 2311, Th. Goldschmidt AG) are placed in a reactor fitted with stirrer and motoring devices and the mixture is heated to 150° C. Over a period of 4 hours, 350 g molten maleic anhydride and a solution consisting of 100 g butyl glycol, 30 g di-tert.-butyl peroxide, and 10 g tert.-butyl-peroxy-2-ethylhexanoate are metered into the reactor. Then it is stirred for a further 2 hours at 150° C., cooled to 100° C., and 140 g water is added. Subsequently, a mixture consisting of 380 g 45% sodium hydroxide solution and 1800 g water is dosed thereto over a period of 30 minutes whereupon a homogeneous dispersion is formed. After cooling, a soft paste with 40% of active substance is obtained which may be diluted with any amount of water. As a result of this polymerization, the copolymer incorporates 56%-wt. alpha-olefin, 17%-wt. polysiloxane monomer, and 27%-wt. maleic anhydride.

Dispersion IV 300 g octadecene-1 is placed in a reactor equipped with stirrer and metering devices and heated to 150° C. Over a period of 4 hours, 250 g molten maleic anhydride, a mixture A consisting of 300 g stearyl methacrylate, 40 g of an alpha, omega-acryloxy-polydimethylsiloxane (Tegomer V-SI 2550, Th. Goldschmidt AG) and 30 g dodecyl mercaptan, as well as a mixture B consisting of 50 g oleic acid methyl ester and 20 g di-tert.-butyl peroxide; are charged. Then stirring is continued for a further 2 hours at 150° C. followed by cooling to 100° C. and addition of a solution which has been heated to 70° C. and consists of 272 g 45% sodium hydroxide solution and 1760 g water; it is stirred at 90° C. until a homogeneous dispersion results. After cooling, a soft paste containing 35% active substance is obtained which may be diluted with any amount of water. As a result of the polymerization, the copolymer incorporates 67.5%-wt. hydrophobic monomers, 4.5%-wt. polysiloxane monomer, and 28%-wt. maleic anhydride.

Dispersion V 490 g of a $C_{20}$ to $C_{24}$ -alpha-olefin mixture and 70 g poly(dimethylsiloxane-co-methylvinyl siloxane) having a viscosity of 1000 mPas and an Si-vinyl content of 0.2 mol-% are placed in a reactor equipped with stirrer and metering devices and heated to 130° C. Subsequently, 70 g acrylic acid, 30 g di-tert-butyl peroxide, 140 g oleic acid methyl ester, 28 g dodecyl mercaptan, and 210 g liquid maleic anhydride are simultaneously charged through different inlets over a period of two hours. After one further hour of reaction at 130° C., the mixture is allowed to cool to 80° C. and a mixture consisting of 252 g NaOH (50%) and 2280 g deionized water is added, followed by stirring for a further hour. A paste which is soft at room temperature and contains approximately 30% active substance is obtained, it may be diluted with any amount of water. As a result of the polymerization, the copolymer incorporates 58,3%-wt.

alpha-olefin, 8.3%-wt. polysiloxane monomer, and 33,3%-wt. hydrophilic monomers.

Examples 1 to 4

Chrome-tanned cattle hide with a shaved substance of 2.0 mm was neutralized to pH 5 and washed with water. In a milling drum, the leather was then treated with the copolymer dispersions at 55° C. and a float length of 110% for 50 minutes. Subsequently, the float was adjusted to pH 3.6 with formic acid; finally, after 30 minutes, the leathers were washed, set-out and dried.

The test results are listed in the following table:

| Example 1–4 | Dispersion 1 | Dispersion 2 | Dispersion 3 | Dispersion 4 |
|---|---|---|---|---|
| Amount of dispersion used (rel. to shaved weight) | 15% | 17% | 10% | 15% |
| Softness (1) of leather | 2 | 1–2 | 2 | 1–2 |
| Maeser-Test, flexes | >50,000 | >50,000 | >50,000 | >50,000 |
| % H$_2$O-Absorption Bally 10% amplitude | 9 | 11 | 12 | 14 |
| | No water penetration after 7 hours | | | |
| H$_2$O-Absorption after 7h, % | 6 | 8 | 8 | 11 |

(1) Softness of leather was evaluated as follows:
1 = very soft, full feel
5 = hard

We claim:

1. A process for softening, fat-liquoring or hydrophobing leather or fur, comprising contacting said leather or fur with a copolymer obtained by polymerization of:
   a) 20 to 70%-wt. of a hydrophobic monomer selected from long-chain alpha-olefins with 12 to 30 C-atoms, long-chain alkyl(meth)acrylates with 12 to 30 C-atoms in the alkyl section, vinyl esters of long-chain carboxylic acids with 12 to 30 C-atoms, long-chain vinyl ethers with 12 to 30 C-atoms, or mixtures of said hydrophobic monomers,
   b) 1 to 60%-wt. of one or more monomers with a polysiloxane group according to formulas (I) or (II):

$$A—Si(R^1)_2—[OSi(R^1)_2]_n—R^2 \quad (I)$$

$$(R^1)_3Si\,[OSi(R^1)_2]_n\,[OSiR^1A]_z\,Si(R^1)_3 \quad (II)$$

wherein the structural units [OSi(R)$_2$] and [OSiR$^1$A] in formula (II) are distributed randomly over the chain and wherein R$^1$=phenyl or methyl, R$^2$=A, phenyl or alkyl with 1 to 30 C-atoms, n=2–100, z=1–3, and A is an unsaturated, radically polymerizable group selected from

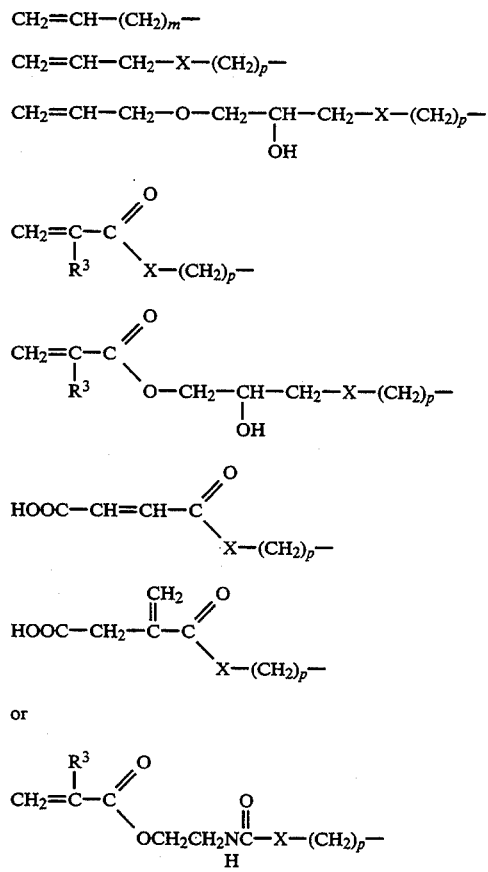

and m=0 to 10, p=1 to 4, R$^3$=H or CH$_3$, and X=O or NH,
   c) 20 to 35%-wt. water-soluble, unsaturated, polymerizable, acid-groups-containing monomers, unsaturated C$_4$–C$_6$ dicarboxylic acid anhydrides, or mixtures thereof, provided that the sum of a), b) and c) adds up to 100%-wt.,
   in partially neutralized form as aqueous solution or dispersion.

2. The process according to claim 1, wherein said water-soluble, unsaturated, polymerizable, acid-groups-containing monomers (c) comprise semi-esters or semi-amides of unsaturated C$_4$–C$_6$-dicarboxylic acids or mixtures thereof.

3. The process according to claims 1 or 2, wherein the copolymer is used in an amount of 2 to 15%-wt. based on the shaved weight of the leather or fur.

4. The process according to claims 1 or 2, comprising using the copolymer in combination with a conventional hydrophobing agent.

5. The process according to claims 1 or 2, comprising using the copolymer in combination with a conventional fat-liquoring agent.

6. The process according to claims 1 or 2, wherein the contacting is effected at a pH of 4–9 and at a temperature of 20°–60° C.

* * * * *